(12) United States Patent
Colucci et al.

(10) Patent No.: US 8,880,197 B2
(45) Date of Patent: Nov. 4, 2014

(54) FLEXIBLY CONFIGURABLE, DATA TRANSMISSION OBJECT

(75) Inventors: Marco Colucci, Lörrach (DE); Dion Bouwer, Reinach (CH); Jochen Stinus, Inzlingen (DE)

(73) Assignee: Endress + Hauser Flowtec AG, Reinach (CH)

( * ) Notice: Subject to any disclaimer, the term of this patent is extended or adjusted under 35 U.S.C. 154(b) by 134 days.

(21) Appl. No.: 12/975,747

(22) Filed: Dec. 22, 2010

(65) Prior Publication Data

US 2011/0153036 A1    Jun. 23, 2011

(30) Foreign Application Priority Data

Dec. 23, 2009  (DE) .......................... 10 2009 055 298
Jan. 26, 2010  (DE) .......................... 10 2010 001 211

(51) Int. Cl.
*G05B 15/02*     (2006.01)
*G05B 19/042*    (2006.01)

(52) U.S. Cl.
CPC .. *G05B 19/0423* (2013.01); *G05B 2219/25428* (2013.01)
USPC ................. 700/9; 700/71; 370/406; 370/493; 709/200

(58) Field of Classification Search
USPC .................. 700/9, 71; 370/406, 493; 709/200
See application file for complete search history.

(56) References Cited

U.S. PATENT DOCUMENTS

| | | |
|---|---|---|
| 6,788,980 B1 | 9/2004 | Johnson |
| 2002/0131451 A1* | 9/2002 | Franke et al. ................. 370/493 |
| 2007/0142934 A1* | 6/2007 | Boercsoek et al. ............. 700/23 |
| 2007/0282463 A1* | 12/2007 | Hodson et al. .................. 700/20 |
| 2009/0013798 A1* | 1/2009 | Hocker ....................... 73/861.03 |
| 2009/0046732 A1* | 2/2009 | Pratt et al. ..................... 370/406 |
| 2009/0112336 A1* | 4/2009 | Duffy et al. ..................... 700/79 |
| 2009/0138693 A1* | 5/2009 | Chomik et al. .................... 713/1 |

FOREIGN PATENT DOCUMENTS

| | | |
|---|---|---|
| DE | 10 2005 060 085 A1 | 6/2007 |
| DE | 10 2007 039 427 A1 | 2/2009 |

* cited by examiner

*Primary Examiner* — Mohammad Ali
*Assistant Examiner* — Anthony Whittington
(74) *Attorney, Agent, or Firm* — Bacon & Thomas, PLLC

(57) ABSTRACT

A field device for connection to a fieldbus, wherein the field device is designed to exchange via the fieldbus a data transmission object with a host computer or with an additional field device, wherein the data transmission object has a plurality of freely loadable, transmission berths, and wherein the field device includes a data mapping structure, which establishes an association between variables to be transmitted and transmission berths of the data transmission object.

13 Claims, 8 Drawing Sheets

| Transmission Berth | VariableID |
|---|---|
| 0 | ID for „mass flow" |
| 1 | ID for „volume flow" |
| 2 | ID for „corrected volume" |
| 3 | ID for „density" |
| 4 | ID for „corrected density" |
| 5 | ID for „temperature" |
| 6 | ID for „totalizer 1" |
| 7 | ID for „totalizer 2" |
| 8 | ID for „totalizer 3" |
| 9 | ID for „system state" |
| 10 | ID for „pressure" |
| 11 | ID for „units of the mass flow" |
| 12 | ID for „units of the volume flow" |
| 13 | ID for „units of the temperature" |
| 14 | ID for „units of the totalizer 1" |
| 15 | ID for „units of the totalizer 2" |

Rows 0–9 grouped as 36; rows 10–15 grouped as 37.

Fig. 4

| Transmission Berth | Format | Variable |
|---|---|---|
| 0 | Float | mass flow |
| 1 | Float | volume flow |
| 2 | Float | corrected volume |
| 3 | Float | density |
| 4 | Float | corrected density |
| 5 | Float | temperature |
| 6 | Float | totalizer 1 |
| 7 | Float | totalizer 2 |
| 8 | Float | totalizer 3 |
| 9 | Integer | system state |
| 10 | Float | pressure |
| 11 | Integer | units of the mass flow |
| 12 | Integer | units of the volume flow |
| 13 | Integer | units of the temperature |
| 14 | Integer | units of the totalizer 1 |
| 15 | Integer | units of the totalizer 2 |

Fig. 6

FLEXIBLY CONFIGURABLE, DATA TRANSMISSION OBJECT

TECHNICAL FIELD

The invention relates to a field device for connection to a fieldbus and designed to exchange a data transmission object with a host computer or an additional field device, as well as a fieldbus system comprising a field device, a fieldbus, a host computer and a control system. The control system is implemented and applies a device description file in which a data transmission object for data exchange between the field device and the host computer or an additional field device is defined. Furthermore, the invention relates to a method for transferring data between a field device and a host computer or an additional field device.

BACKGROUND DISCUSSION

In process automation technology, field devices are often applied, which serve for registering and/or influencing process variables. Examples for such field devices include fill level measuring devices, mass flow measuring devices, pressure- and temperature measuring devices, etc., which, as sensors, register the corresponding process variables, fill level, flow, pressure, or temperature.

Serving for influencing process variables are actuators, e.g. valves or pumps, via which the flow of a liquid in a pipeline section, or the fill level in a container, can be changed.

Referred to as field devices are, in principle, all devices, which are applied near to the process and which deliver, or process, process relevant information.

A large number of such field devices are produced and sold by the firm, Endress+Hauser.

SUMMARY OF THE INVENTION

An object of the invention is to provide a flexibly configurable, data transmission object for data exchange between a field device and a host computer or an additional field device.

Advantageous further developments of the invention are set forth in the dependent claims.

A field device of the invention for connecting to a fieldbus is designed to exchange a data transmission object with a host computer or with an additional field device via the fieldbus, wherein the data transmission object has a number of freely loadable transmission berths, and wherein the field device includes a data mapping structure, which establishes an association between variables to be transmitted and the transmission berths of the data transmission object.

A fieldbus system of the invention includes a fieldbus, a field device, which is connected to the fieldbus, a host computer, in which at least one of a device management unit or a control for the field device is implemented, either of which applies a device description file of the field device. Defined in the device description file is a data transmission object for data exchange between the field device and the host computer or an additional field device. The data transmission object includes a number of freely loadable, transmission berths. The field device includes a data mapping structure, which associates variables to be transmitted with the transmission berths of the data transmission object.

In the solution of the invention, the data transmission object applied for data exchange is set up by the interaction of a basic structure provided by the device description file with a concrete variable mapping, wherein the variable mapping is predetermined by a data mapping structure contributed by the field device. Through this cooperation between the basic structure and the data mapping structure, on the one hand, it is enabled, that the data transmission object can be adapted flexibly to new requirements. Such new requirements can result, for example, when new software versions are employed in the field device or new modules are applied. Such new requirements can also result, when new functionalities are implemented for control or device management. In the case of the solutions of the state of the art, it has been, in each case, necessary to modify, and newly employ, the device description file, when it was necessary to transmit new variables. Since the associating of variables to the individual transmission berths now is no longer performed by the device description file, but, instead, by a separate data mapping structure kept for the field device, there is absent the necessity of having continually to adapt the device description file to new requirements. The required changes for the variables to be transmitted can alone be effected by modifying the data mapping structure, while the device description file remains unchanged over a relatively long period of time.

An advantage of the data transmission object set up according to the invention is that, by modification of the data mapping structure, which is stored for the field device, a fast and flexible adapting of the variables transmitted in the data transmission object to the particular requirements can be performed. When it is required, for example, to transmit additional variables in the data transmission object, either a transmission berth, which is still not occupied, can be loaded with the new variables, or a previously transmitted variable can be replaced by the new variable. In this way, the set of transmitted variables can be adapted, in a simple manner, to new software versions, applications or modules.

A further advantage of the flexibly configurable, data transmission objects of the invention is that the device description file determines only the basic structure of the data transmission object, while the association of the variables to the individual transmission berths is performed, not by way of the device description file, but, instead by the field device. In the case of the previously used solutions, the variable mapping was likewise specified by the device description file, and, thus, it was necessary to adapt the device description file each time, when a new association between variables and transmission berths was performed. In the case of the solution of the invention, only the basic structure of the data transmission object is predetermined by the device description file. Absent the necessity, to substitute for the device description file, in the case of each adapting of the variable mapping, a changed version occurs. The device description file, or, as it is sometimes referred to, the driver, can be used unchanged for a longer time, because the particular association of variables to the transmission berths is performed dynamically on the part of the field device. In this way, the device description file, or the driver, is independent of the details of the field device, and, especially, of the software version of the field device and the respective device character of the field device. When it comes here to changes, these changes can be taken into consideration by modification of the data mapping structure. In the face of different software- and hardware versions of the field device, a compatibility between device description file and field device is given. In this way, compatibility between device description file, or driver, and field device is improved. The integration effort at control system level is reduced, and, moreover, also the maintenance effort at system level is reduced, since the so-called life-cycle-management in the interaction between device description file and field device is simplified.

BRIEF DESCRIPTION OF THE DRAWINGS

In the following, the invention will now be explained in greater detail on the basis of a number of examples of embodiments presented in the drawing, the figures of which show as follows:

FIG. 4 is a mapping table, which is implemented on the part of the field device and establishes an association between the transmission berths and the variables transmitted there;

FIG. 6 is a data transmission object, whose concrete construction results from the interaction between the basic structure illustrated in FIG. 3 and the mapping table illustrated in FIG. 4.

DETAILED DISCUSSION IN CONJUNCTION WITH THE DRAWINGS

Figure 1:
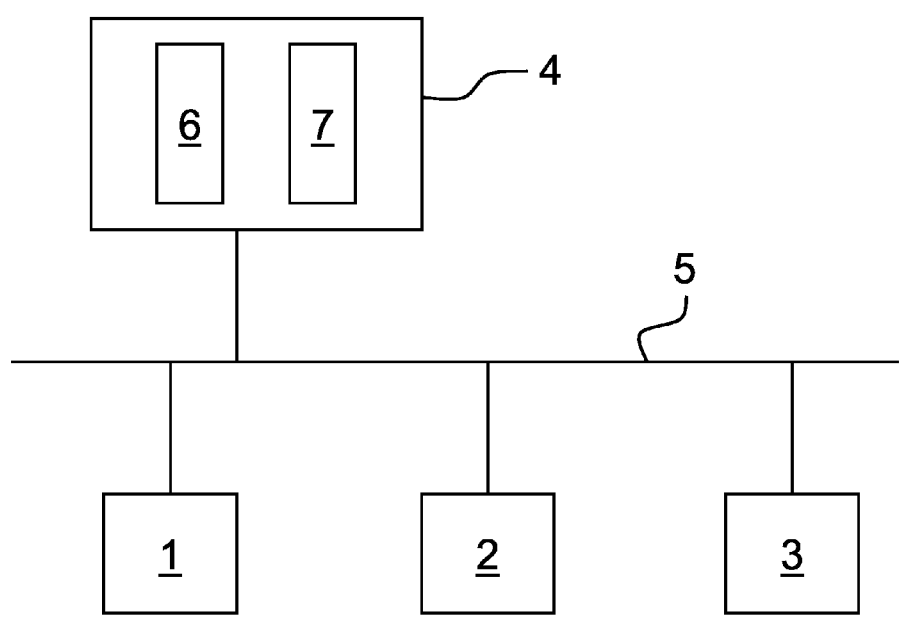
FIG. 1 is a schematic drawing of a fieldbus system.

FIG. 1 shows a fieldbus system, which includes three field devices 1, 2, 3 as well as a host computer 4 as a superordinated unit. The field devices 1, 2, 3 are connected via a fieldbus 5 with the host computer 4. Preferably, fieldbus 5 is a modern fieldbus utilizing one of the various Ethernet standards, for example, the standard EtherNet/IP. In the host computer 4, for example, a control system 6 can be implemented, which receives, or requests, from at least some of the field devices 1, 2, 3 in regular intervals, measured values and derives therefrom actuating variables, which are then fed to one or more of the field devices 1, 2 or 3.

For example, the fieldbus system illustrated in FIG. 1 could be an overfilling preventer for a container for a liquid. Field device 1 measures the fill level in the container. Field device 2 is a valve and controls the outflow of the liquid from the container. Furthermore, there is yet a limit level switch in the form of field device 3, which registers the maximal fill level in the container. The control system 6, which can, for example, be implemented as a SoftPLC programmable logic controller, controls the fill level in the container as a function of the registered data.

Additionally, or alternatively, to the control system 6, the host computer 4 can implement a device management tool 7. An example of such a device management tool is the program "FieldCare" of the firm, Endress+Hauser, which works according to the FDT (Field Device Tool) standard. The device management tool 7 serves in first line for parametering and configuring the field devices 1, 2, 3 connected to the fieldbus 5. From the device management tool 7, parameters of the field devices 1, 2, 3 connected to the fieldbus 5 can be seen, monitored and changed. Moreover, the device management tool 7 serves also for defect analysis and diagnosis of the connected field devices 1, 2, 3. In order to be able suitably to access the individual field devices 1, 2, 3 and set their parameters, so-called device description files are integrated in the device management tool 7 for specifying the properties of the field devices. A device description file, which frequently is also referred to as a driver, contains, for example, information concerning the properties and abilities of the field device as well as concerning the function blocks and parameters of the field device. In the case of typical fieldbus systems, a plurality of different device description files are integrated in the device management tool 7.

Device description files for various standard can, moreover, also be used to provide the control system 6 the necessary information concerning the properties of the connected field devices. There are a number of different standards for device description files. Some of these standards are suitable only for the device management tool 7, others only for the control system 6, and, in turn, other are suitable for both applications. In the EtherNet/IP field, for example, device description files of the EDS (Electronic Data Sheet) standard are applied, which can be used both by the control system 6 as well as also by the device management tool 7.

Corresponding to the forms of embodiment of the present invention, data exchange between the host computer and a field device connected to the fieldbus is performed with the assistance of a data transmission object, which provides a number of data transmission berths for data exchange. Alternatively, or supplementally, the data transmission object can also be applied for data exchange between two field devices. In such case, the basic structure of the data transmission object is predetermined, while the associating of the variables to be transmitted to the different data transmission berths can be flexibly configured and, when required, also modified. In this way, a flexibly adapting of the data transmission object to particular requirements is enabled. Especially, the selection of variables, which are transmitted in the data transmission object can, in simple manner, be adapted to changed requirements, for example, for a new software version for the field device. When so far unused transmission berths are available, these can subsequently be occupied with new variables. Moreover, it is, at any time, possible to substitute, for variables transmitted previously in the data transmission object, a changed selection of variables.

Figure 2A:
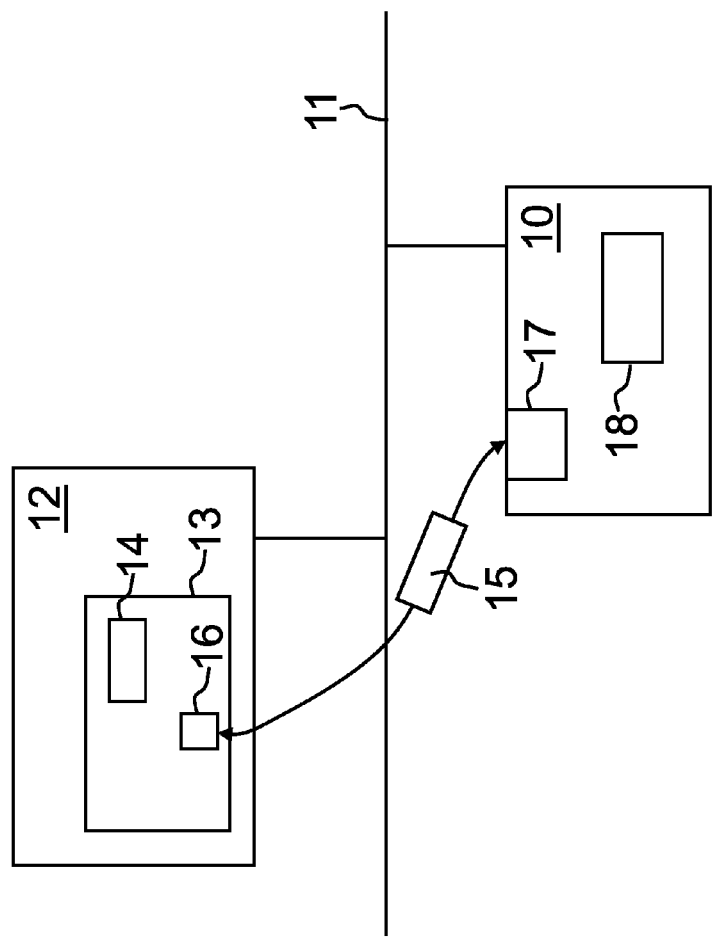
FIG. 2A shows the data exchange of the invention between a control system implemented in a host computer and a field device.

FIG. 2A shows a fundamental principle of the invention. A field device 10 is connected via a fieldbus 11 with a host computer 12, and a control system 13 is installed in the host computer 12. For description of the properties of the field device 10, there is provided for the control system 13 a device description file 14, preferably in the EDS format. In this device description file 14 for the field device 10 is fixed the basic structure of a data transmission object 15, which provides a predetermined number of data transmission berths for data exchange between the field device 10 and the host computer 12. The data transmission object 15 is transmitted back and forth in both directions between the field device 10 and the host computer 12. Both on the part of the control system 13 as well as also on the part of the field device 10, buffer memory 16, 17 can be provided, which serves for intermediate storage of the data transmitted in the data transmission object 15.

The associating of variables, especially of parameters and measured variables, with the individual transmission berths of the data transmission object 15 occurs with the assistance of a mapping table 18, which is provided in the field device 10. This mapping table 18 specifies, which variable is transmitted in which transmission berth of the data transmission object 15. Transmitted in a transmission berth can be, in each case, exactly one variable. As a function of the variable type to be transmitted, the berth provided for transmission is either completely utilized or only partially for the transmission of the variables. In case for the transmission of a variable the entire transmission berth is not required, the remaining bytes of the transmission berth are filled with fill bytes.

On the basis of the representation illustrated in FIG. 2A, it can be recognized, that the basic structure of the data transmission object 15 is defined in the device description file 14, while the associating of variables to the different transmission berths of the data transmission object 15 occurs with the assistance of the mapping table 18, which is provided in the field device 10. In this way, the associating of variables with the individual transmission berths of the data transmission object 15 can, when required, be modified without great effort and adapted to new conditions and requirements.

The associating of transmission berths of the data transmission object and the variables to be transmitted is first fixed with the assistance of the mapping table 18. However it can be necessary to transmit the mapping information contained in the mapping table 18 completely or partially from the field device 10 to the host computer 12. In this way, it is achieved, that the mapping information is made available also to the host computer 12. In this way, also in the host computer 12 the transmission berths of the data transmission object can be filled with variables, which then are transmitted from the host computer 12 to the field device 10. The mapping information contained in the mapping table 18 can, for example, be transmitted, with the assistance of reports provided for this purpose, from the field device 10 via the fieldbus 11 to the host computer 12. In a preferred form of embodiment of the invention, there is in the host computer 12 a mirror image of the mapping table 18 present in the field device 10.

Figure 2B:
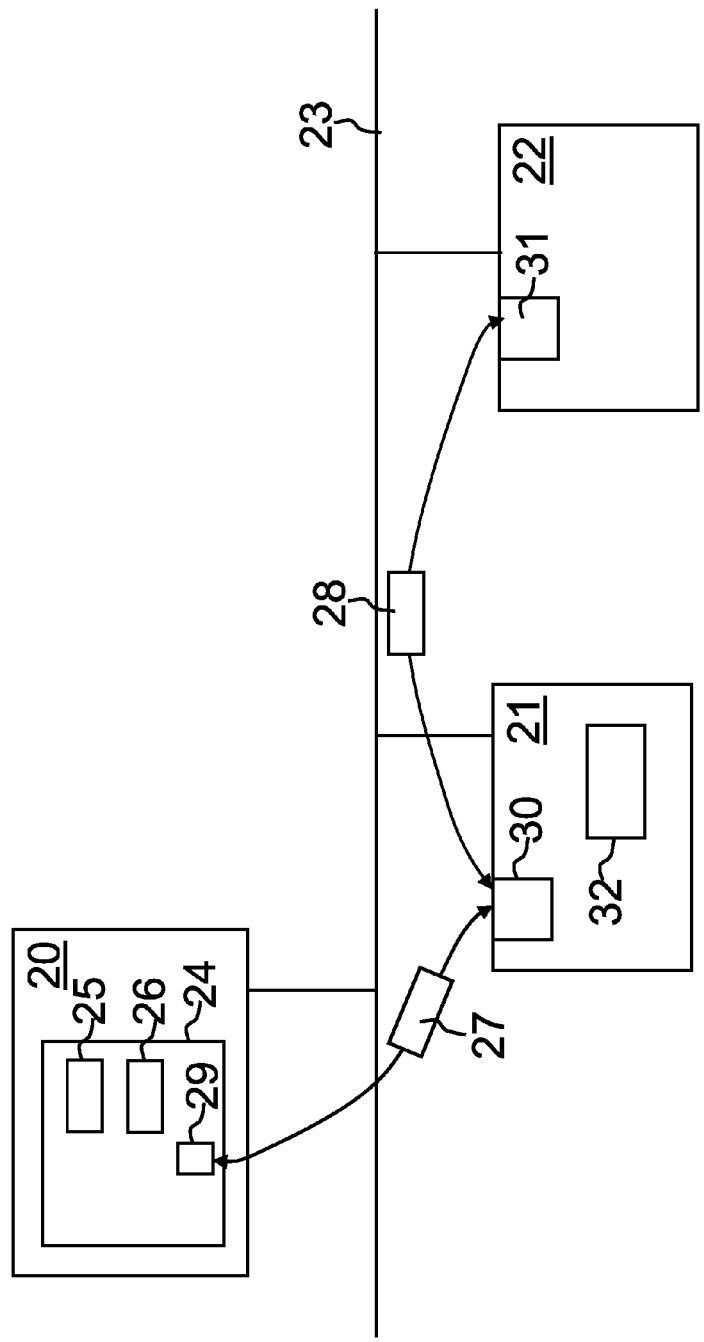
FIG. 2B shows the data exchange of the invention between a control system implemented in a host computer, a field device and an additional field device.

FIG. 2B shows how the data exchange object of the invention can be used not only for data exchange between field device and host computer, but, instead, also for data exchange between two field devices. For this, there is shown in FIG. 2B a fieldbus system, which includes a host computer 20, a first field device 21 as well as a second field device 22, all connected to a fieldbus 23. In the host computer 20 is installed a control system 24. Integrated in the control system 24 are device description files 25, 26, which describe the properties of the field devices 21 and 22. The first device description file 25 describes the first field device 21, and the second device description file 26 describes the second field device 22.

In the first device description file 25 is fixed, moreover, the basic structure of the data transmission objects used by the first field device 21, especially the number and size of the transmission berths. Transmitted back and forth between the field device 21 and the host computer 20 is a data transmission object 27, which is constructed corresponding to this basic structure. Additionally, in the form of embodiment illustrated in FIG. 2B, there can also be transmitted back and forth between the field device 21 and the field device 22 a data transmission object 28, which likewise is constructed corresponding to this basic structure. In the second device description file 26, a modified basic structure can be established for the data transmission objects used by the second field device 22. However, also the same basic structure can be used for all data transmission objects.

Both the host computer 20 as well as also the field devices 21, 22 have buffer memory 29, 30, 31 to intermediate storage of the variables transmitted in the data transmission objects 27, 28.

In the first field device 21, a data mapping structure 32 is provided, which establishes the associating of variables with the transmission berths of the data transmission objects 27 and 28. In the data mapping structure 32, there is especially fixed, which variables are transmitted in the data transmission objects 27 and 28 from the field device 21 to the host computer 20, from the host computer 20 to the field device 21, from the field device 21 to the field device 22 and from the field device 22 to the field device 21. In such case, the associating of variables with the transmission berths can be identical for both data transmission objects 27 and 28. Alternatively, it is, however, also possible to transmit, in the data transmission objects 27, which are exchanged with the host computer 20, other variables than in the data transmission objects 28, which are exchanged between the two field devices 21 and 22. In this case, the data mapping structure 32 would include first mapping information for the data transmission objects 27 and second mapping information for the data transmission objects 28.

Also in the case of the form of embodiment illustrated in FIG. 2B, the loading of the transmission berths is fixed first by the data mapping structure 32 in the first field device 21. Also here, it can, however, be necessary to mirror the mapping information wholly or partially in the host computer 20 and in the second field device 22, in order that the host computer 20 and the second field device 22 can fill the data transmission objects 27, 28 with variables corresponding to the type and manner fixed in the data mapping structure 32.

Figure 3:
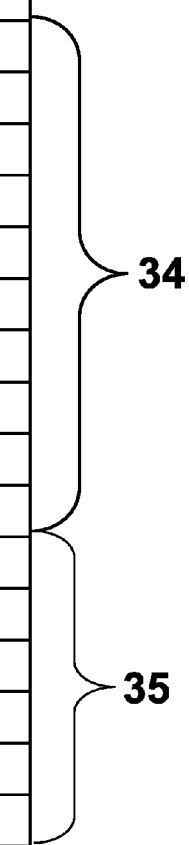
FIG. 3 is a basic structure of a data transmission object of the invention predetermined by the device description file.

FIG. 3 shows a possible basic structure for the data transmission object. This basic structure is specified in the device description file 14, or 25. As is recognizable on the basis of FIG. 3, the data transmission object comprises 16 transmission berths, wherein each transmission berth possesses a fixedly predetermined length of four bytes. In a transmission berth, exactly one variable can be transmitted.

Depending on variable type, the four bytes available per transmission berth are utilized completely or only partially. In case less than four bytes are required for transmission of a variable, the remaining bytes of the transmission berth are filled with fill bytes. Used as fill byte can be, for example, the value "0xFF". For example, for transmission of a variable of the variable type "float", the four bytes of a transmission berth are required completely. Also for transmission of a variable of the type "ASCII-string", all four bytes of a transmission berth are required. In contrast, there are different options available in the case of transmission of a variable of type "integer": For transmission of a one-byte integer, only one of the four bytes is required, and the remaining three bytes of the transmission berth are filled with fill bytes. For transmission of a two-byte-integer, two of the four bytes are required, and the remaining two bytes of the transmission berth are filled with fill bytes. For transmission of a four-byte integer, in contrast, all four bytes of a transmission berth are required.

In addition to number and size of the individual transmission berths, a communication direction is specified in the device description file for each transmission berth. A transmission berth can be provided for transmission of a so-called input variable in transmission direction from a field device to the host computer or to an additional field device. Alternatively thereto, a transmission berth can be provided for transmission of a so-called output variable in the direction from the host computer or from the additional field device to the first field device. The references "input variable" and "output variable" refer, in each case, to whether the host computer, or the other field device, receives the particular variable as input or provides such as output.

In the case of the basic structure of a data transmission object illustrated in FIG. 3, a first region 34 is provided, comprising transmission berths 0 to 9, for transmission of input variables from a field device to the host computer or to an additional field device. A second region 35, comprising transmission berths 10 to 15, is for transmission of output variables in the direction from the host computer or from the additional field device to the first field device. The basic structure shown in FIG. 3, including the transmission direction fixed for each transmission berth, is fixedly predetermined by the device description file 14, or 25, and, thus, it is not possible to modify, which transmission direction is associated with the individual transmission berths.

The basic structure shown in FIG. 3 is fixed by the device description file 14, or 25. In the following, the corresponding extract from the device description file composed corresponding to the EDS standard is presented:
[Assembly]
Assem17=
"Input Parameter All",
"20 04 24 90 30 03",
40,
0x0000,
",
320,;
Assem18=
"Output Parameter All",
"20 04 24 91 30 03",
24,
0x0000,
",
192,, The part of the code involving "Assem17" and "Input Parameter All" establishes the first region 34 of input variables for ten transmission berths for variables of, in each case, four bytes. The numbers "20 04 24 90 30 03" refer to the start address of the memory range, in which the input variables to be transmitted are stored. The number "40" in the next row states that the first region 34 has a length of 40 bytes, thus 10×4 bytes. Then there follows that a descriptor, "0x0000", and, at the end of the code establishing the first region 34, it is given that the first region 34 should have a length of 40×8 bits, thus 320 bits.

Then, "Assem18" and "Output Parameter All" establish the second region 35 for the output variables within the data transmission object. The numbers "20 04 24 91 30 03" give a start address of the region 35 of output variables. Then, there is specified, that the second region 35 of output variables has, as a whole, a length of 24 bytes, which corresponds to six transmission berths of four bytes each. Then, the descriptor "0x0000" is given, and, at the end of the code, it is stated, that the second region 35 has a length of 24×8 bits, thus 192 bits.

The presented section of code of the device description file 14, or 25, establishes the basic structure of the data transmission object shown in FIG. 3. Especially, the length of the first region 34 of input variables and the length of the second region 35 of output variables earlier is fixed, so that ten transmission berths are provided for the input variables and six transmission berths for the output variables.

The associating of variables with the individual transmission berths happens with the assistance of the mapping table 18, which is provided in the field device 10. FIG. 4 shows this mapping table 18. Associated with each of the sixteen transmission berths of the data transmission object is a VariableID, which uniquely specifies the variable to be transmitted in the given transmission berth. From the setting of the variable to be transmitted there results also the variable type.

First, in the first region 36 of the mapping table, the input variables are established, which are transmitted from the field device to the host computer. Assigned to transmission berth 0 is the variable "mass flow", transmission berth 1 the variable "volume flow", transmission berth 2 the variable "corrected volume", and transmission berth 3 the variable "density". In transmission berth 4, the variable "corrected density" is transmitted, and in transmission berth 5 the variable "temperature". In transmission berths 6, 7 and 8, the result values of the three totalizers provided by the field device are transmitted from the field device to the host computer. These totalizers are provided to sum, or integrate, a specified input value over a determined time span. In transmission berth 9, the parameter "SystemState" is transmitted from the field device to the host computer. The input variables transmitted in transmission berths 0 to 8 involve variables of type "float", thus around floating point numbers. The parameter "SystemState" transmitted in transmission berth 9 is a variable of type "integer".

In the second region 37 of the mapping table, it is established, which output variables are transmitted in transmission berths 10 to 15 from the host computer to the field device. For this, a corresponding VariableID is associated with each of the transmission berths 10 to 15. In transmission berth 10, the variable "pressure" is transmitted from the host computer to the field device, wherein the pressure can be measured, for example, by an additional field device. In this way, a current value of the pressure can be transmitted to a field device from the host computer. In transmission berths 11 to 15, the parameters "units of the mass flow", "units of the volume flow", "units of temperature", "units of the totalizer 1" and "units of the totalizer 2" are transmitted from the host computer to the field device. These parameters give, in which units the measurement results ascertained on the part of the field device should be presented and communicated via the fieldbus. Each desired unit is specified by the host computer in the form of an integer-value. The variable "volume flow" can, for example, be represented in "$cm^3/s$", in "ml/min", or also in "barrel/s", and, depending on choice of the unit, of course, also the numerical measured value changes, which is transmitted as input variable in the respective transmission berth (in the case of the "volume flow", for example, in transmission berth 1) regularly from the field device to the host computer or to an additional field device.

In the mapping table illustrated in FIG. 4, the particular variable associated with a transmission berth is identified with the assistance of a unique VariableID. Used as VariableID can be any identifier, which uniquely specifies the desired variable. Such a unique associating can be accomplished, for example, with the assistance of the ModBus-number of a variable.

The advantage of the mapping table illustrated in FIG. 4 is that it can be modified and adapted to changed requirements at any time. A first opportunity for accomplishing program modification is to modify the mapping table provided in the field device and to perform a new associating of VariableIDs with the individual transmission berths directly via the field device. Alternatively thereto, the associations of VariableIDs with transmission berths are modified by the device management tool installed in the host computer. For this, there is input to the device management tool a changed mapping, which is then transmitted in the form of a configuration object to the field device and there initiates the corresponding program modification of the mapping table. A third opportunity is to access and to modify the mapping table stored in the field device via a web server.

A further advantage of the, flexibly configurable, data transmission objects of the invention is, moreover, that only the basic structure of the data transmission object is predetermined by the device description file, while the associating of the variables with the individual transmission berths is performed not by the device description file, but, instead, by the field device. In the case of the previously used solutions, the variable mapping was likewise specified by the device description file, and, thus, it was necessary to modify the device description file each time that a new associating between variables and transmission berths was performed. In the case of the solution of the invention, predetermined by the device description file is only the basic structure of the data transmission object. Insofar, there is absent the necessity to substitute a changed version of the device description file for each adapting of the variable mapping. The device description file, or the driver, can be used unchanged for a longer time, because the particular associating of variables to transmission berths is performed dynamically by way of the field device. Thus, the device description file, or the driver, is independent of the details of the field device, and especially of the software version of the field device and the respective device character of the field device. When it comes to changes here, these can be taken into consideration by modification of the mapping table. Insofar, compatibility between device description file and field device is given in the face of different software- and hardware versions of the field device. In this way, compatibility between device description file, or driver, and field device is improved. The integration effort at control system level is reduced, and, moreover, also the maintenance effort at system level is reduced, since the so-called life-cycle management is simplified by the cooperation between device description file and field device.

The mapping table shown in FIG. 4 can supplementally include other information for the variables to be transmitted. For example, for each VariableID, a physical source address can be given, where the variable to be transmitted is stored.

In addition to establishing the mapping table, it must be established for each variable type, in which sequence and according to which schema the bytes to be transmitted are assigned to the bytes of the transmission berth. This establishing, in which manner the four bytes of the transmission berth will be occupied by the bytes of a determined variable type, is not performed by way of the mapping table. The placement schema is established earlier on the part of the field device by the setting of parameters provided for this. For each variable type, it is established, according to which schema and in which sequence the bytes of a variable of a determined type, thus, for example, float, 1-byte integer, 2-byte integer, 4-byte integer and ASCII string, the bytes of a transmission berth will be assigned, and which bytes of the transmission berth will be filled with fill bytes. As soon as the schema for the loading of the transmission berths is established by suitable parametering, a user need no longer be concerned with the loading of the individual bytes of the transmission berth. Especially, a user, in setting up the mapping table, need not be concerned about in which manner a determined variable type is transmitted. The user simply assigns a variable to a certain transmission berth.

Figure 5:
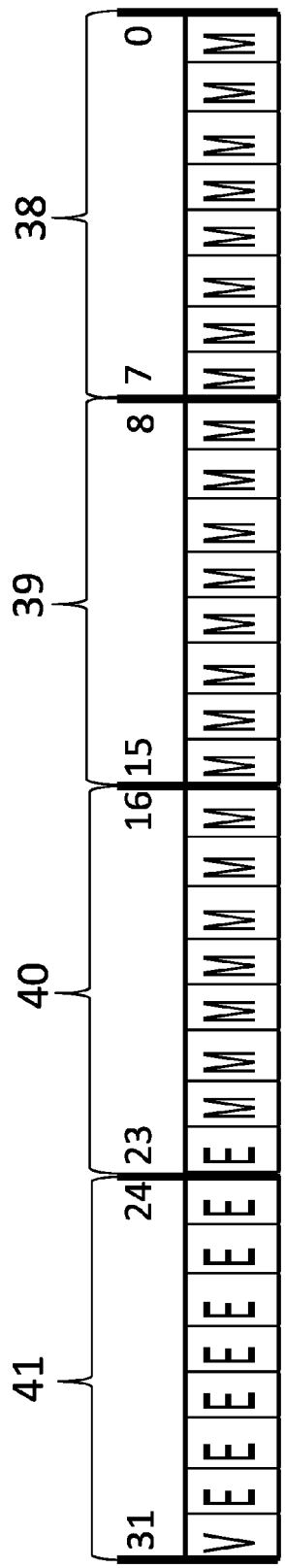
FIG. 5 is a data structure of a variable of the type "float"

On the basis of FIG. 5, it will now be explained for the example of the variable type "float" according to IEEE 754, how the assignment of the bytes to be transmitted to the bytes of the transmission berth is established. FIG. 5 shows the data structure of the variable type "float". The bits 0-22 referenced with "M" form the mantissa of the floating point number, while the bits 23-30 referenced with "E" establish the exponent, and bit 31, which is referenced with "V", is the sign bit. Insofar, a variable of type "float" is composed of four bytes 38 to 41, wherein the zero byte 38 contains the bits 0-7 of the mantissa, the first byte 39 the bits 8-15 of the mantissa, the second byte 40 the bits 16-22 of the mantissa, as well as the bit 23 of the exponent, and the third byte 41 the bits 24-30 of the exponent as well as the sign bit 31. These four bytes 38 to 41 can now be assigned in various ways to the four bytes provided per transmission berth. If the bytes to be transmitted are associated with a transmission berth corresponding to the schema "2301", then first the second byte 40 is transmitted, then the third byte 41, then the zero byte 38 and then the first byte 39. Alternatively thereto, some applications provided on the part of the host computer require a different transmission order. In this case, the transmission order can be adapted to the particular application by establishing for the field device a suitable placement schema by the setting of parameters provided for this. When the parameters are correctly set, transmission of a certain variable type functions in the desired manner, wherein neither the device description file in the host computer nor the mapping table in the field device needs to be adapted to the desired transmission schema.

From the interaction of the basic structure of the data transmission object illustrated in FIG. 3 with the mapping table illustrated in FIG. 4, there results the structure of the data transmission object shown in FIG. 6, wherein a belonging variable is associated with each of the sixteen transmission berths. In transmission berths 0 to 9, the following input variables are transmitted from the field device to the host computer: Mass flow, volume flow, corrected volume, density, corrected density, temperature, totalizer 1, 2, 3 and system state. In the reverse direction, thus in the direction from the host computer to the field device, the following variables are transmitted in transmission berths 10 to 15: Pressure, units of the mass flow, units of the volume flow, units of temperature, units of the totalizer 1, units of the totalizer 2.

Returning to FIG. 2A, the data transmission object 15 shown in FIG. 6 can be applied for regular data exchange between the control system 13 and the field device 10. From the field device 10, at regular intervals, current measured values for mass flow, volume flow, etc. are transmitted to the control system 13. In the reverse direction, the control system 13 transmits to the field device 10 the system pressure as well as the, in each case, desired units, in which the different physical variables should be measured. Additionally, also actuating variables could be transmitted from the control system 13 to the field device 10. When the data transmission object 15 is applied for transmission of current measured values from the field device 10 to the host computer 12, it is, as a rule, sensible, to transmit the data transmission object 15 back and forth between the field device 10 and the host computer 12 at regular time intervals. For example, a special connection can be set up between the field device 10 and the host computer 12, in which it is also established that transmission of the data transmission object 15 should occur at regular time intervals. In this way, it is especially achieved, that the current measured values are provided to the control system 13 with little delay.

Figure 7:
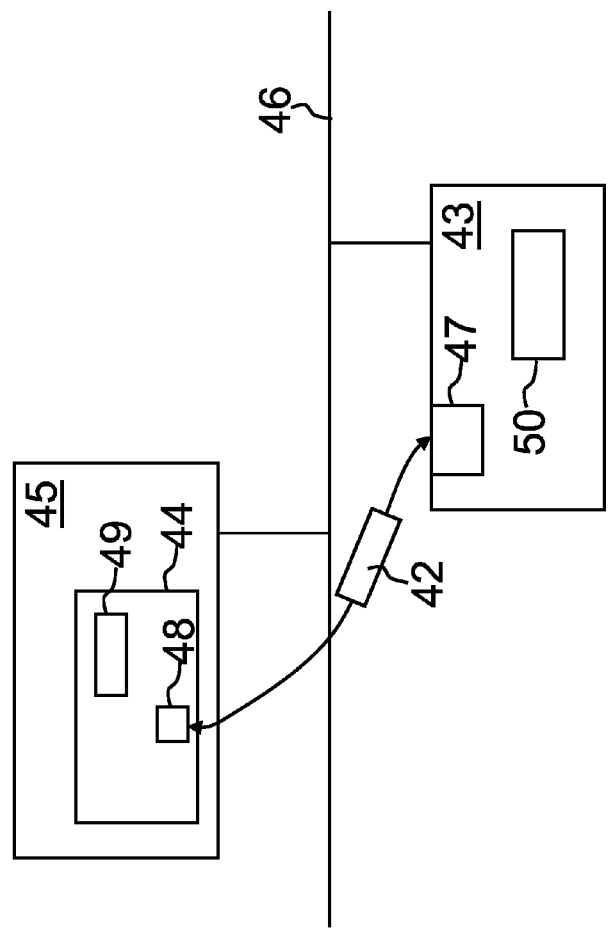
FIG. 7 shows data exchange between a device management tool implemented in a host computer and a field device.

FIG. 7 shows another opportunity for application of the data transmission object of the invention, in the case of which a data transmission object 42 is applied for data exchange between a field device 43 and a device management tool 44. The device management tool 44 is installed in a host computer 45, which is connected via the fieldbus 46 with the field device 43. Both on the part of the field device 43 as well as also on the part of the host computer 45, buffer memory 47, 48 can be provided for the intermediate storage of the variables transmitted by way of the data transmission object 42. While the basic structure of the data transmission object 42 is established by a device description file 49, which is integrated into the device management tool 44, is the associating of variables with the individual transmission berths is established by a mapping table 50 of the field device 43.

In the case of data exchange between the device management tool 44 and the field device 43, of first concern is the parametering and configuration of the field device 43 as well as state monitoring and error diagnosis. Insofar, parameter values, error indicators as well as diagnostic information are transmitted in the direction from the field device 43 to the device management tool 44. Along with that, it can also be useful to transmit measured values from the field device 43 to the device management tool 44, in order that the device management tool 44 can follow the operation of the field device 43. In reverse direction, thus from the device management tool 44 to the field device 43, parameter values are transmitted, which serve for configuration and parametering of the field device.

Along with that, as already indicated on the basis of FIG. 4 and FIG. 6, the units desired for the performed physical measurements are transmitted from the device management tool 44 to the field device 43. Since, in the case of data exchange between the device management tool 44 and the field device 43, of first concern is the exchange of parameter values, it is not necessarily required to transmit the data transmission object 42 back and forth on a regular time schedule on the fieldbus 46. Depending on the field of application, it can be sufficient to transmit the data transmission object 42 under event control: Each time, when, in one of the buffer memories 47, 48, a parameter value changes, a transmission of the data transmission object 42 is triggered. In this way, the data transmission object 42 need only be transmitted when parameter values have changed.

In the examples illustrated in FIG. 2A and FIG. 2B, the data transmission object was applied for data exchange between control system and field device, while the data transmission object in FIG. 7 is applied for data exchange between device management tool and field device. The data transmission object can, moreover, also be designed to implement both data exchange with the control system as well as also data exchange with the device management tool, wherein control system and device management tool are implemented in the same host computer. In this case, both parameters for the device management tool as well as also measured values for the control system are transmitted in the data transmission object.

The invention claimed is:

1. A fieldbus system, comprising:
a fieldbus;
a field device, which is connected to said fieldbus; and
a host computer, in which at least one of a device management unit or a control system for said field device is implemented and applies a device description file of said field device; wherein:
in said device description file, a data transmission object for data exchange between said field device and said host computer or an additional field device is defined, which includes a plurality of freely loadable, transmission berths;
said device description file, serves to establish that the data transmission object has a certain number of transmission berths for input variables, which are transmitted in the data transmission object from the field device to the host computer or to the additional field device; or
said device description file, serves to establish that the data transmission object has a certain number of transmission berths for output variables, which are transmitted in the data transmission object from said host computer or from said additional field device to the field device;
said field device provides variables to be transmitted and includes a data mapping structure, which effects an association of variables to be transmitted with transmission berths of said data transmission object; and
the field device is also configured to completely or partially transmit the mapping information contained in the data mapping structure from the field device to the host device or to the additional field device.

2. A field device for connection to a fieldbus system as defined in claim 1, wherein the field device is configured to exchange, via the fieldbus, a data transmission object with a host computer or with an additional field device, wherein:
said data transmission object has a plurality of freely loadable, transmission berths;
the field device includes a data mapping structure, which establishes an association between variables to be transmitted and the freely loadable transmission berths of said data transmission object; and
the field device is also configured to transmit the mapping information contained in the data mapping structure completely or partially from the field device to the host device or to the additional field device.

3. A field device as claimed in claim 2, wherein:
said data mapping structure is designed to associate with at least one of said transmission berths of said data transmission object as a variable identifier, which establishes a variable to be transmitted in said transmission berth.

4. The fieldbus system as claimed in claim 1, wherein:
said data mapping structure is designed to associate with at least one of said transmission berths of said data transmission object as a variable identifier, which establishes the variable to be transmitted in said transmission berth.

5. The fieldbus system as claimed in claim 1, wherein:
a number of bytes provided per transmission berth is utilized completely or only partially for transmission of a variable to be transmitted.

6. The fieldbus system as claimed in claim 1, wherein:
said control system is implemented in said host computer; and
said data transmission object is designed to exchange data between said field device and said control system.

7. The fieldbus system as claimed in claim 1, wherein:
a device management unit is implemented in said host computer; and
said data transmission object is designed to exchange data between said field device and said device management unit.

8. The fieldbus system as claimed in claim 1, wherein:
transmission of data transmission objects between said field device and said host computer or said additional field device occurs at predetermined time intervals.

9. The fieldbus system as claimed in claim 1, wherein:
transmission of data transmission objects is triggered when a value of a variable to be transmitted in the data transmission object changes.

10. The fieldbus system as claimed in claim 1, wherein:
transmission of data transmission objects is triggered when a request on the part of said host computer or said device management unit is present.

11. The fieldbus system as claimed in claim 1, wherein:
association between transmission berths and the variables to be transmitted is established from said device management unit, which is designed, to transmit configuration data via said fieldbus to said field device and to modify the data mapping structure provided by said field device corresponding to the configuration data.

12. The fieldbus system as claimed in claim 1, wherein:
association between transmission berths and the variables to be transmitted is established from a web server;
the data mapping structure stored in said field device is modified corresponding to specifications made via said web server.

13. A method for transmitting data between a field device and a host computer or an additional field device, comprising the steps of:

setting up a data transmission object corresponding to a device description file, wherein the data transmission object includes a plurality of freely loadable, transmission berths;

assigning of variables to be transmitted to transmission berths corresponding to a data mapping structure, wherein the data mapping structure is present on the field device and mapping information for the data mapping structure is partially or completely transmitted from the field device to the host computer or to the additional field device, and transmitting the variables to be transmitted in the data transmission object between the field device and the host computer or the additional field device, wherein:

providing that the data transmission object has a certain number of transmission berths for input variables, which are transmitted in the data transmission object from the field device to the host computer or to the additional field device; or providing that the data transmission object has a certain number of transmission berths for output variables, which are transmitted in the data transmission object from the host computer or from the additional field device to the field device.

\* \* \* \* \*